United States Patent [19]

Schacht et al.

[11] 4,039,457
[45] Aug. 2, 1977

[54] COILED FILTER ELEMENT FOR FILTERING OF LIQUIDS

[75] Inventors: Hans Schacht, Stuttgart; Fritz Cub, Schwabach, both of Germany

[73] Assignee: Robert Bosch G.m.b.H., Stuttgart, Germany

[21] Appl. No.: 648,716

[22] Filed: Jan. 13, 1976

Related U.S. Application Data

[63] Continuation of Ser. No. 438,035, Jan. 30, 1974, abandoned.

[30] Foreign Application Priority Data

Feb. 2, 1973    Germany .............................. 2305128

[51] Int. Cl.² ...................... B01D 27/06; B01D 29/06; B01D 29/10
[52] U.S. Cl. ........................... 210/493 R; 210/497 FB
[58] Field of Search ....................... 210/493, 494, 497; 55/520, 500, 521

[56] References Cited

U.S. PATENT DOCUMENTS

| 2,564,637 | 8/1951 | Chase | 210/494 |
| 2,889,932 | 6/1959 | MacKintosh | 210/494 |
| 3,279,616 | 10/1966 | Bourdale | 210/493 |
| 3,606,739 | 9/1971 | Peterson | 55/521 |
| 3,739,916 | 6/1973 | Cub et al. | 210/497 |
| 3,759,391 | 9/1973 | Dreher | 210/494 |

FOREIGN PATENT DOCUMENTS 755,481   8/1956   United Kingdom ................. 210/494

Primary Examiner—Thomas G. Wyse
Assistant Examiner—Ernest G. Therkorn
Attorney, Agent, or Firm—Michael J. Striker

[57] ABSTRACT

A strip of filter material is folded so as to form two closely adjacent strip portions which are of one piece and have aligned longitudinally extending free edges and longitudinally extending second edges transversely spaced from the free edges and unitary with one another. The strip is coiled so that each of the strip portions forms a plurality of convolutions which alternate with the convolutions of the other strip portion. Means is provided in the region of the second edges for preventing liquid being filtered from forcing contaminant particles through the filter material.

7 Claims, 4 Drawing Figures

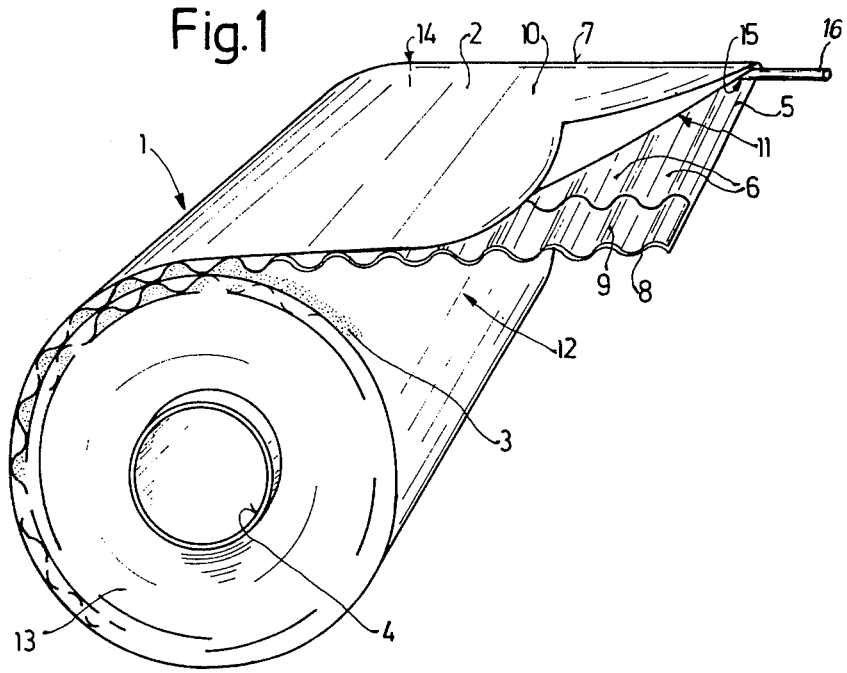
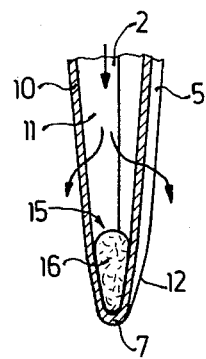
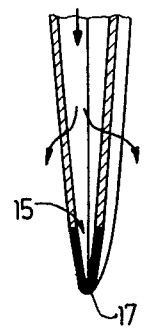

COILED FILTER ELEMENT FOR FILTERING OF LIQUIDS

This is a continuation of application Ser. No. 438,035, filed Jan. 30, 1974, now abandoned.

BACKGROUND OF THE INVENTION

The present invention relates generally to a filter element for filtering of liquids, and more particularly to a coiled filter element for the filtration of liquids.

It is already known from U.S. Pat. No. 3,739,916 to provide a coiled filter element by convoluting a strip of filter material which is first folded to a substantially V-shaped configuration so as to have two superimposed strip portions, both of which define with one another a V-shaped pocket or cross section. When these strip portions are convoluted they form two spirally intercalated internal filter chambers one of which is open in the region where the free edges of the strip portions are located, and the other of which is open in the region where the unitary edges of the strip portions are located. Such a filter element, which may be made of conventional filter paper or the like, has been found to be highly advantageous, but has also been found to have one significant disadvantage which requires correction. In particular, it is found that when liquid to be filtered and containing contaminant particles, enters into the open side of the V-shaped cross section defined between the two strip portions, pressure variations which take place in the region where the unitary edges of the two strip portions are located, tend to force contaminant particles through the material of the strip together with the liquid which is being filtered. This of course disadvantageously influences the degree of effectiveness of the filter element.

SUMMARY OF THE INVENTION

Accordingly, it is a general object of the present invention to provide an improved coiled filter element of the type here in question.

More particularly, it is an object of the present invention to provide such a coiled filter element which provides an improvement in the filtration effectiveness, in that it significantly reduces or even entirely eliminates any possibility that contaminant particles might pass through the filter material together with the filtered liquid.

In keeping with the above objects, and with others which will become apparent hereafter, one feature of the invention resides in a filter element for filtering of liquids which, briefly stated, comprises a strip of filter material which is so folded so as to form two closely adjacent strip portions consisting of one piece and having aligned longitudinally extending free edges between which liquid to be filtered enters, and longitudinally extending second edges transversely spaced from the respective free edges and in the region of which filtered liquid passes through the filter material. The strip portions are unitary along their second edges only, because of the folding of the strip portions, and the strip is then coiled so that each of the strip portions forms a plurality of convolutions which alternate with the convolutions of the other strip portion. The convolutions of the strip portions define two spirally intercalated internal filter chambers one of which is open in the region of the free edges and closed in the region of the second edges due to the strip portions being folded and therefore unitary along the second edges. Preventing means is provided in the region of the second edges, for preventing the liquid from forcing contaminant particles through the filter material.

The preventing means according to the present invention so influences the flow of liquid to be filtered in the region of the unitary second edges that the liquid is no longer able to force contaminant particles through the filter material, that is to carry them along. The provision of this preventing means does not involve any significant additional expenditures in terms of labor and materials, so that the provision of this means can be readily incorporated in the existing production facilities for coiled elements of the type in question without increasing the manufacturing expenses to any appreciable extent.

It is particularly advantageous if the preventing means is in form of an uncoated thread composed of a plurality of fibers, for instance a thread of wool or the like, which is located at the bottom of the V-shaped pocket, that is where the two second edges are unitary with one another. Such a thread can readily be incorporated in the filter element as the strip thereof is being coiled, and serves to deflect the flow of liquid which moves axially of the coiled filter element from the open side where it enters between the longitudinally extending free edges towards the closed side where the second edges are unitary with one another. By deflecting the liquid flow, or at least damping the same, it prevents the flow from enabling contaminant particles from working their way through the filter material, and due to the provision of the many fibers of which the thread is composed, the contaminant particles tend to become settled in the interstices between the filaments of the thread, at least until the thread is saturated with such particles. It is, however, also possible to utilize a different approach which does not require the aforementioned thread. According to this concept of the invention, those edge portions of the two strip portions which extend along and define the two unitary second edges may be saturated with an appropriate substance, for instance adhesive which hardens, a synthetic plastic resin or the like, that renders them liquid-impervious. This also can be done at the same time as the strip is being coiled, and the contaminant particles then tend to accumulate in this liquid-impervious region, whereas liquid can still pass freely through the filter material outside this region.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view illustrating a filter element according to the present invention;

FIG. 2 is an enlarged fragmentary sectional detail view, showing a portion of the filter element of FIG. 1;

FIG. 3 is a view similar to FIG. 2, illustrating a different embodiment of the invention.

DESCRIPTION OF THE PREFERRED EMBODIMENTS

Figure 4:
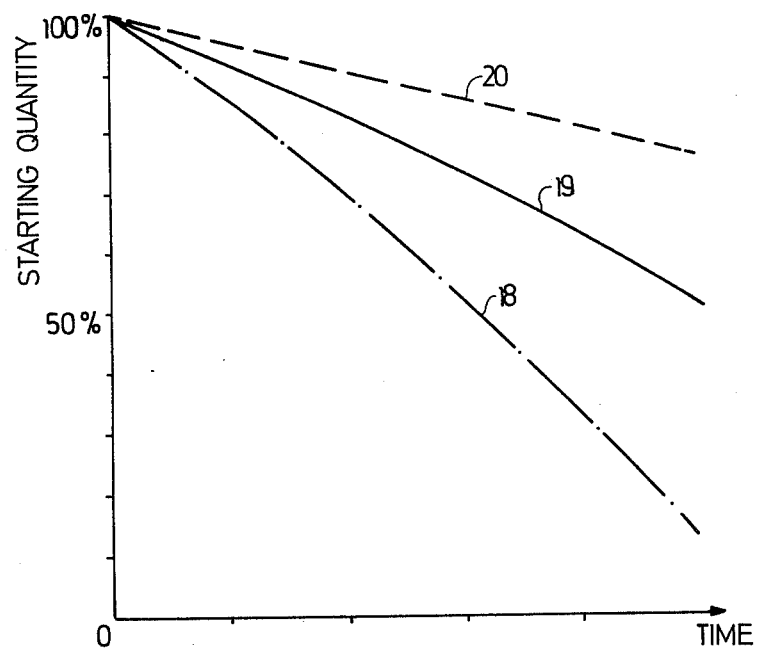
FIG. 4 is a graph, illustrating the operating characteristics of a coiled filter element according to the prior art and by comparison of the filter elements according to the present invention as explained with respect to the embodiments of FIGS. 2 and 3, respectively.

Referring now in detail to the drawing, and firstly to FIG. 1, it will be seen that reference numeral 1 identifies a coiled filter element of the invention in toto. The coiled filter element is composed of a strip 2 of filter material, for instance filter paper, which is folded transversely of its elongation to an essentially V-shaped configuration. The strip in folded condition is coiled about a center tube 4 and the free edges of the two strip portions created by the folding — and which are identified with reference numerals 5 and 10, respectively, are spaced from one another because at least one of the strip portions (here the strip portion 5) is formed with a plurality of corrugations 6 which extend transversely of the elongation of the strip in parallelism with one another. They extend over the entire width of the strip portion 5 normal to the line 7 along which the two strip portions 5 and 10 are connected with one another, that is where they have connected edges which are unitary with one another. The strip portion 5 has an inwardly folded edge region 9 which is located between the strip portion 5 and the strip portion 10 as illustrated. This edge region 9 is also corrugated and serves to reinforce the region 8 of the strip portion 5 to prevent deformations of the corrugations 6 during convolution to such an extent that they would become closed and not permit the entry of liquid to be filtered. Advantageously, the material of the strip 2 is crepe-type filter paper, and in this case the strip portion 10 need not be corrugated, but is essentially smooth. The corrugations 6 in the strip portion 5 serve the purpose of compensating for length variations between the strip portions 5 and 10 as the strip 2 is being convoluted, in the manner which is disclosed in U.S. Pat. No. 3,739,916. In addition, they do of course provide passages for liquid to be filtered and also serve to stiffen the entire construction.

A strip or layer 3 of adhesive, such as a thermoplastic material, is located between the strip portion 5 of each convolution and the strip portion 10 of the adjacent convolution which surrounds it. The strip 3 extends along the region 8 so that the finished filter element 1 is provided with two spirally intercalated internal filter chambers 11 and 12, one of which is open from the axial end 13 of the filter element 1, whereas the other is open at the axial end 14 of the filter element. The ends of the strip 2, that is the inner end connected with the tube 4 and the outer end, are sealed in conventional manner.

In the region of the connected edges of the strip portions 5 and 10, that is where the fold line 7 extends, the strip portion 5 and the strip portion 10 include with one another a pocket or space 15 in which, according to the embodiment of FIG. 2, there is located a thread 16 consisting of a plurality of fibers, for instance a thread of wool. This thread is admitted during the convoluting of the strip about the tube 4 and extends along the entire length of the fold line 7.

Before convoluting the strip is folded on the same machine. Thereby the thread is arranged along the fold line 7 in a non convoluted portion of the strip 2, where the strip portions 5 and 10 form just an angle of about 90°; afterwards the folding process is finished and the strip is convoluted. The finished filter element 1 is inserted into a conventional housing and so sealed that the axial end 13 can communicate only with a source of liquid to be filtered, whereas the axial end 14 can communicate only with a receiver for filtered liquid.

In operation, and as shown clearly in FIG. 2, the pressure difference which develops between the space 11 at which the material to be filtered enters and the space 12 at which the filtered liquid exits through the filter material, causes the wool thread 16 to be pushed all the way into the pocket 15. Pressurized liquid to be filtered which enters axially into the filter, in the direction of the arrow shown in FIG. 2, will largely pass through the filter material of the strip portions 5 and 10, indicated by the arrows, whereas the coarser contaminant particles are prevented by the material of the portions 5 and 10 from passage through the same, and descend to the region of the thread 16. The thread 16 prevents the liquid to be filtered from reaching the area of the fold line 7 in un-throttled conditions, that is with sufficient energy to push or pull such particles through the material in the region of the full line 7, as would occur over a period of time. It is well known that over a period of time such particles can, due to pressure variations which occur and movements in the filter paper itself, work their way through the filter paper and be carried along with the stream of filtered liquid. Since the flow speed is dampened by the presence of the thread 16, and since the thread 16 which is composed of many fibers tends to absorb a large percentage of these particles, the filtering effectiveness of the novel filter element is substantially improved over what is known from the prior art.

The embodiment in FIG. 3 differs from that of FIG. 2 in that the thread 16 has been omitted. Like reference numerals identify like elements as in FIG. 2. In FIG. 3, however, the regions or zones of the strip portions 5 and 10 which extend along the fold line 7, i.e., along the two unitary edges of the strip portions 5 and 10, are saturated with a suitable material — such as an adhesive, a synthetic plastic resin or the like — which renders these regions liquid-impermeable. Such resins, adhesives or the like are well known in the art and are usually of the type which imparts liquid impermeability when it has set. When liquid now enters in the direction of the arrow in FIG. 3, it will again pass through the strip portions 5 and 10 to issure from the exterior thereof as filtered liquid. Contaminant particles tend to become deposited at the bottom of the space 15, since liquid cannot penetrate the saturating material 17, and since the particles themselves therefore cannot work their way through the filter material. They accumulate to the space 15 and thus the filter element of FIG. 3 also provides for a substantially increased filtering effectiveness.

The embodiment of FIG. 3 can be produced in a very simple and efficacious manner if a spray nozzle is provided which extends during the convoluting of the strip 2 from the axial end 13 of the filter element into the space 11, and which continuously sprays an appropriate substance — e.g. an adhesive, a synthetic plastic resin or the like — against the regions of the strip portions 5 and 10 which are shown to be impregnated as at 17. This liquid substance is absorbed by the filter paper of the portions 5 and 10 and after hardening constitutes an impermeable layer, or at least a layer which substantially reduces the permeability.

FIG. 4 shows graphically the improved filtering action which can be obtained with the present invention as compared to the prior art. The characteristic line 18 identifies the filtering effectiveness of a spirally coiled filter element according to the prior art, that is a filter element which is not possessed of the inventive improvement. The line 19 identifies the filtering effectiveness of a filter element according to FIGS. 1 and 2 of the present application, whereas the line 20 identifies the filtering effectiveness of a filter element according to the embodiment in FIG. 3. The starting quantity is expressed in percent and represents a measure of the wear which was observed on a test pump that was used to pass liquid to be filtered through the three types of filter elements represented by the lines 18, 19 and 20; thus, the degree of wear constitutes a measure of the filtering effectiveness of each filter element, because the greater the amount of contaminant particles that was able to pass through the respective filter element, the greater the degree of wear found in the pump to which the filtered liquid was recirculated. It will be observed that given the same length of operating time for the embodiments represented by the lines 19 and 20 as for the embodiment of the prior art represented by line 18, the quantity of liquid which passed through the filter elements represented by the lines 19 and 20 is substantially greater, a result of the substantially better filtering effectiveness of the elements represented by these lines.

It will be appreciated that various modifications may be made without departing from the intent of the invention. One of these is to contact or impregnate the wool thread 16 before it is inserted between the portions 5 and 10, or of course a thread of a material other than wool could be utilized.

It will be understood that each of the elements described above, or two or more together, may also find a useful application in other types of constructions differing from the types described above.

While the invention has been illustrated and described as embodied in a coiled filter element for filtering liquids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A filter element for filtering of liquids, particularly contaminant-containing liquids, comprising a unitary strip of filter material formed with a fold so as to have two closely adjacent strip portions consisting of one piece and having aligned longitudinally extending free edges between which liquid to be filtered enters and longitudinally extending unitary second edges transversely spaced from the respective free edges and in the region of which filtered liquid passes through said filter material, said strip portions due to said folding being unitary along said second edges only, and said strip being coiled so that each of said strip portions forms a plurality of convolutions which alternate with the convolutions of the other strip portion, the convolutions of said strip portions defining two spirally intercalated internal filter chambers one of which is open in the region of said free edges and closed in the region of said second edges due to said strip portions being folded and therefore unitary along said second edges; means for closing the other of said intercalated internal filter chambers along said free edges of said strip portions, so that said intercalated internal filter chambers are open and closed along opposite edges of said strip portions, respectively; and liquid-permeable foraminous contaminant-entrapping uncoated multi-fiber thread means for permitting passage of incoming liquid through the foramina of said means while entrapping contaminants contained in the liquid, said means being provided within the fold of said strip portions in the region of said unitary second edges so as to prevent the liquid flowing through the formania from forcing contaminant particles through said filter material.

2. A filter element as defined in claim 1, wherein said foraminous contaminant-entrapping means comprises an elongated element located intermediate said two strip portions and proximally within the bight portion of the fold for deflecting the flow of incoming liquid.

3. A filter element as defined in claim 1, wherein said foraminous contaminant-entrapping means comprises an elongated element extending along and closely adjacent to said unitary second edges.

4. A filter element as defined in claim 3, wherein said thread is a wool thread.

5. A filter element as defined in claim 3, wherein said elongated element is composed of a plurality of interstices for entrapping the contaminant particles deposited by the incoming liquid.

6. A filter element as defined in claim 1, wherein at least one of said strip portions has a plurality of at least substantially parallel transverse corrugations which compensate for length variations due to coiling of said strip.

7. A filter element as defined in claim 1, wherein said fold comprises a pocket of substantially V-shaped configuration.

* * * * *